(12) United States Patent
Durnell et al.

(10) Patent No.: US 8,550,628 B2
(45) Date of Patent: Oct. 8, 2013

(54) EYE TRACKING APPARATUS

(75) Inventors: Laurence Durnell, Alton (GB); Donald Nigel Jarrett, Bristol (GB)

(73) Assignee: Qinetiq Limited, Hampshire (GB)

( * ) Notice: Subject to any disclaimer, the term of this patent is extended or adjusted under 35 U.S.C. 154(b) by 67 days.

(21) Appl. No.: 13/320,322

(22) PCT Filed: May 25, 2010

(86) PCT No.: PCT/GB2010/001034
§ 371 (c)(1),
(2), (4) Date: Nov. 14, 2011

(87) PCT Pub. No.: WO2010/136753
PCT Pub. Date: Dec. 2, 2010

(65) Prior Publication Data
US 2012/0057129 A1 Mar. 8, 2012

(30) Foreign Application Priority Data
May 27, 2009 (GB) .................................. 0909126.5

(51) Int. Cl.
*A61B 3/14* (2006.01)
*A61B 3/10* (2006.01)

(52) U.S. Cl.
USPC .......................................... 351/210; 351/221

(58) Field of Classification Search
USPC ................................................ 351/200–246
See application file for complete search history.

(56) References Cited

U.S. PATENT DOCUMENTS

| | | | |
|---|---|---|---|
| 5,430,505 A * | 7/1995 | Katz .............................. | 351/208 |
| 5,689,736 A | 11/1997 | Okuyama et al. | |
| 5,815,741 A | 9/1998 | Okuyama et al. | |
| 5,912,769 A | 6/1999 | Iizuka et al. | |
| 6,008,484 A * | 12/1999 | Woodgate et al. .......... | 250/201.1 |
| 6,568,808 B2 * | 5/2003 | Campin ......................... | 351/209 |
| 7,384,399 B2 | 6/2008 | Ghajar | |
| 7,401,920 B1 * | 7/2008 | Kranz et al. .................. | 351/210 |
| 2002/0181733 A1 | 12/2002 | Peck | |
| 2012/0057129 A1 * | 3/2012 | Durnell et al. ................ | 351/210 |

FOREIGN PATENT DOCUMENTS

WO WO 97/35223 A1 9/1997

OTHER PUBLICATIONS

British Search Report issued in British Application No. GB0909126.5 dated Sep. 24, 2009.
International Search Report issued in International Application No. PCT/G82010/001034 dated Aug. 25, 2010.
Written Opinion of the International Searching Authority issued in International Application No. PCT/GB2010/001034 dated Aug. 25, 2010.

* cited by examiner

*Primary Examiner* — Mohammed Hasan
(74) *Attorney, Agent, or Firm* — Oliff & Berridge, PLC

(57) ABSTRACT

An eye tracking apparatus for monitoring the movement of a user's eye, the apparatus including: a display for displaying an image; an eye imaging sensor for monitoring the user's eye and for providing an output indicative of the user's point of regard in the user's field of vision; an optical combiner arranged, in use, in optical communication with the display, the eye imaging sensor and the user's eye; said optical combiner arranged to receive the displayed image from the display, to project said image into the user's field of vision, to receive electromagnetic radiation reflected from the user's eye and to pass said reflected radiation to the eye imaging sensor; wherein the optical combiner is adapted to substantially correct for aberrations in the reflected radiation introduced therein by the optical combiner.

16 Claims, 2 Drawing Sheets

EYE TRACKING APPARATUS

BACKGROUND

The present invention relates to an eye tracking apparatus and to a method of monitoring the movement of a user's eyes. Without limitation, the invention relates specifically to an integrated optical display unit and eye tracking apparatus.

Conventional eye tracking apparatuses, particularly head mountable apparatuses incorporating display units, are heavy, bulky and cumbersome. Traditional techniques for integrating eye tracking systems into head mountable display units (for example, simple combiner mirror or prism) also suffer from disadvantages such as limited field of view, eyestrain and low user comfort.

SUMMARY

It is an object of the invention to provide an eye tracking apparatus which mitigates at least one disadvantage of conventional devices.

According to a first aspect of the present invention, there is now proposed an eye tracking apparatus for monitoring the movement of a user's eye, the apparatus comprising:

(a) a display for displaying an image, (b) an eye imaging sensor for monitoring the user's eye and for providing an output indicative of the user's point of regard in the user's field of vision, (c) an optical combiner, in optical communication with the display, the eye imaging sensor; said optical combiner arranged to receive the displayed image from the display, to project said image into a user's field of vision, to receive electromagnetic radiation reflected from the user's eye and to pass said reflected radiation to the eye imaging sensor, wherein the optical combiner is adapted to substantially correct for aberrations in the reflected radiation introduced therein by the optical combiner.

Preferably, the optical combiner exhibits an optical power along a primary optical axis such that the displayed image is magnified to provide the projected image.

The ability of the eye tracking apparatus to correct for aberrations is advantageous in that it enables simultaneous projection of an image into a user's field of vision and imaging of the user's eye through a common optical element.

In a preferred embodiment, the optical combiner comprises a prismatic combiner arranged, in use, in a first optical path between the user's eye and the eye imaging sensor.

The optical combiner may have at least one curved surface arranged, in use, in a second optical path between the display and the user's eye, the at least one curved surface being adapted to receive the displayed image or to project said image. The at least one curved surface comprises a spherical surface or an aspheric surface.

In a preferred embodiment, the prismatic combiner comprises an anamorphic prismatic combiner.

Preferably, the optical combiner has at least one substantially planar surface arranged along the first optical path, the at least one planar surface being adapted to pass the reflected radiation to the eye imaging sensor. The substantially planar surface may be disposed on a part of the at least one curved surface and arranged in optical communication there-with. The substantially planar surface and the at least one curved surface are arranged in optical communication with one another via an adhesive index matched therewith.

Where the optical combiner has at least one curved surface arranged, in use, in a second optical path between the display and the user's eye, and at least one substantially planar surface arranged along the first optical path adapted to pass the reflected radiation to the eye imaging sensor, said first and second optical paths between the at least one curved surface and the user's eye are preferably coaxial.

Preferably, the primary optical axis along which the optical combiner exhibits its optical power is arranged at non zero angle to a normal to the at least one substantially planar surface.

In a preferred embodiment, the eye tracking apparatus further comprising an aperture, arranged in use, in optical communication with the eye imaging sensor and the user's eye. The aperture and the least one substantially planar surface may cooperate to correct for aberrations in the reflected radiation introduced therein by the at least one curved surface of the optical combiner.

According to a second aspect of the present invention, there is now proposed head mounted display system comprising an eye tracking apparatus according to the first aspect of the invention.

According to a third aspect of the present invention, there is now proposed a method of monitoring the movement of a user's eye comprising the steps of:

(a) displaying an image, (b) magnifying said image and projecting said magnified image into the user's field of vision along a first optical path through an optical component having an optical power associated therewith, (c) imaging the user's eye through said optical component along a second optical path, the first and second optical paths being at least partly coincidental and partly non-coincidental, (d) correcting along a non-coincidental portion of the second optical path for aberrations in images of the user's eye introduced along said coincidental optical path as a consequence of the optical power of the optical component.

The method may comprise the additional step of:

(e) providing an output indicative of the user's point of regard in the user's field of vision.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

BRIEF DESCRIPTION OF THE DRAWINGS

Preferred features of the present invention will now be described, purely by way of example, with reference to the accompanying drawings, in which.

DETAILED DESCRIPTION OF THE EMBODIMENTS

It is often beneficial to present the user of an integrated display/eye tracking system with a large field of view (FoV) to provide maximum flexibility. Many applications require a 30°-40° display, for example, a wearable computer, general medical diagnostic techniques etc.

The device must also be as compact and lightweight as possible and the eye tracker must be robust, work in real-world conditions and have a simple calibration routine.

These FoV, size/weight requirements emphasise the importance of display projection system and display and eye tracker integration.

To obtain a miniature 30°-40° projection display a conventional approach (plane combiner and magnifier lens system) is not appropriate because the resulting module will be bulky.

The novel and inventive approach adopted in the present invention is to use an optical prism module which can use a combination of reflection and refraction from surfaces of a prism to project the image and correct most of the distracting optical aberrations including distortion. Also once the design has been completed and moulds made, production of this type of module can be very low cost. This type of system provides the best compromise in the trade-off between image FoV, image quality, module size/weight and cost.

Display/eye tracker integration is also key; it must not noticeably degrade display performance or impair the ergonomics of the system, yet must collect a good quality image of the eye. It is also preferable for the presence of the eye tracking components to be hidden from the user.

Figure 1:
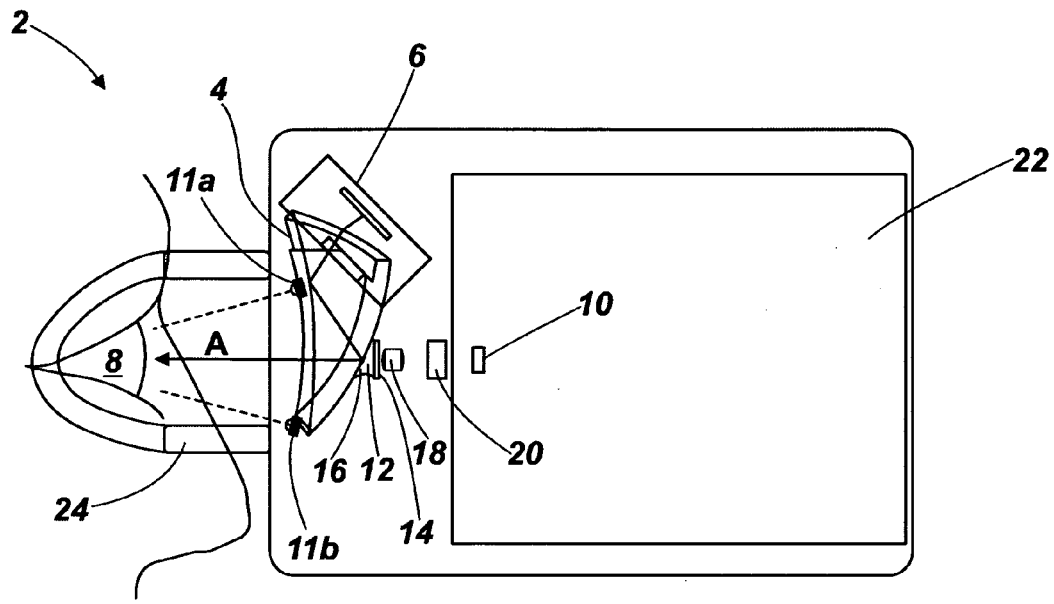
FIG. 1 shows a schematic cross sectional view of an eye-tracking apparatus according to one embodiment of the present invention in which a display element and an eye-tracking sensor are integrated via a prismatic combiner and an optical adapter.

Referring to FIG. 1, the present eye tracking apparatus 2 integrates the eye tracking optics using a prism combiner 4. Specifically, the prism combiner 4 receives an input image from a display module 6 and projects an output image to the user's eye 8 along path A. The input displayed image is routed through the prism combiner 4 by multiple reflections/refractions to provide a magnified virtual image of the image displayed on the displayed on the display module 6.

The main problem with this integration is that the eye imaging path from the user's eye 8 to the eye imaging sensor 10 must pass through the prism combiner 4. Optically the prism combiner 4 is a wedge shaped element with curved surfaces. The eye is illuminated with infrared radiation from infrared illuminators 11a, 11b. Transmission of light reflected from the eye along the imaging path through such an element will introduce significant off-axis aberrations, which would be difficult to correct with a simple lens system. This would result in either unacceptable eye image quality which would degrade eye tracker performance or an expensive and difficult to manufacture lens system.

However, the present embodiment reduces the magnitude of these aberrations without the need for an expensive/complex optical arrangement.

Specifically, a conformal optical adapter 12 is used to reduce the aberrations. The output surface 14 of the adapter is planar and is arranged on-axis with the eye tracker imaging system. The input surface 16 of the optical combiner has substantially the same curvature as the prism combiner 4 and the material is a close match with the refractive index of the prism. The conformal optical adapter optionally comprises a flat optical surface (e.g. a glass plate) bonded to the rear curved face of the prism combiner 4 using an optical adhesive. In this case, the flat optical surface and the optical adhesive each have a refractive index substantially matched to that of the prism combiner 4. The conformal optical adapter 12 with a flat external surface minimises optical aberrations from this interface.

Optionally, an additional lens group 18 is used in the optical path before the eye imaging sensor 10 to correct for any residual optical aberrations in the image of the user's eye. A filter 20 is optionally used to block stray visible radiation from the projected image. Image information output from the eye imaging sensor 10 is processed by imaging electronics 22 to provide an output indicative of the user's point of regard in the user's field of vision. A rubber eye-cup 24 is optionally used to steady the eye tracking apparatus with respect to the user's eye.

Figure 2A:
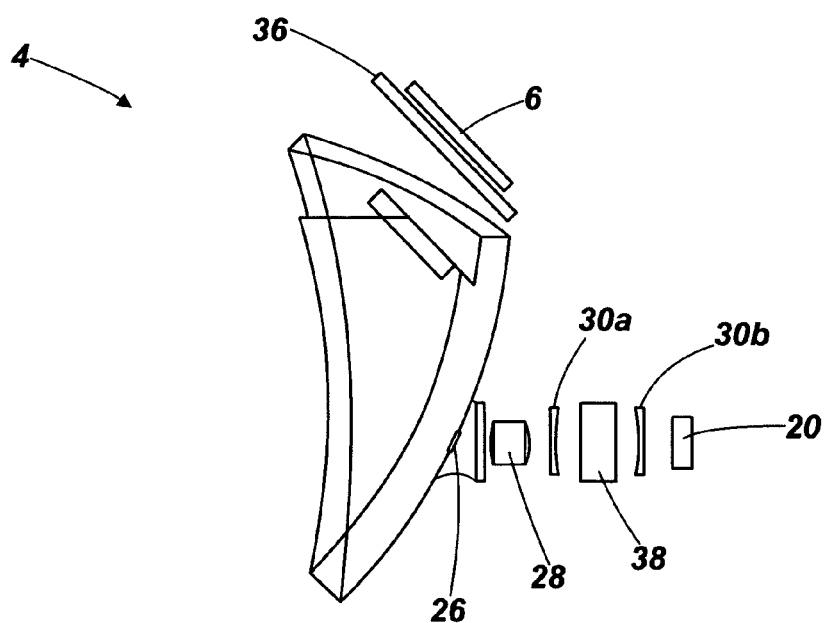
FIG. 2 shows alternative configurations of the anamorphic prism combiner configuration of FIG. 1. Specifically, in FIG. 2a the combiner includes a coating on the rear face of the prism which is substantially reflective at visible and infrared wavelengths. The reflective coating has an aperture therein through which the eye-tracking sensor images the observer's eye. Alternatively, in FIG. 2b the coating on the rear face of the prism is substantially reflective at visible wavelengths but substantially transmissive at wavelengths to which the eye-tracking sensor is sensitive, for example transmissive at infrared wavelengths.
In FIG. 2b the eye-tracking sensor images the observer's eye through a disc aperture.

In the embodiment of the invention illustrated in FIG. 2a, the prism combiner 4 has a reflective rear face provided by a metallised (silvered) coating into which an aperture 26 is created to allow transmission of the near infra-red eye tracker imaging radiation from the user's eye. The size of this aperture 26 will be a trade-off between transmission efficiency, optical aberrations and the impact on display image quality. The small missing region of display light as a consequence of the aperture 26 is not obvious to the user because it is not from a focal plane coincident with the display. It may be apparent only as a slight dimming of the display image when viewed from a particular position. This conformal adapter 12 will remove the bulk of the off-axis aberrations and the remaining aberrations will be reduced further by a combination of the eye imaging lens 28 and optionally correction lenses 30a, 30b.

Figure 2B:
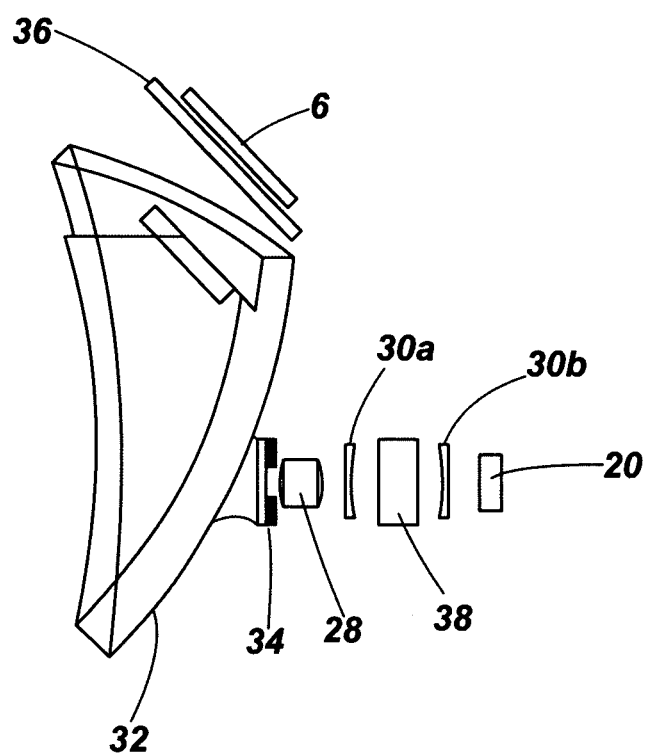

In an alternative embodiment shown in FIG. 2b, the entire reflective coating of the prism 4 is replaced with a coating 32 which will reflect visible and transmit near infra-red radiation. In this embodiment, a disc aperture 34 replaces the aperture 26 from the previous embodiment and performs the same function as aperture 26.

A complimentary filter 36 is optionally used in front of the display 6 to remove display emission in the eye tracker infra-red band. Alternatively, or in addition, a filter 38 is used to reduce any infrared (IR) radiation from display 6 to prevent said radiation entering the eye imaging optical system.

The present apparatus provides a compact display device integrated with an eye tracker to form a compact, rugged module for measuring movement of a user's eye or eyes.

In view of the foregoing description it will be evident to a person skilled in the art that various modifications may be made within the scope of the invention.

Each feature disclosed in the description, and (where appropriate) the claims and drawings may be provided independently or in any appropriate combination.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived there-from. In particular, with reference to the appended claims, features from dependent claims may be combined with those of the independent claims and features from respective independent claims may be combined in any appropriate manner and not merely in the specific combinations enumerated in the claims.

The invention claimed is:

1. An eye tracking apparatus for monitoring the movement of a user's eye, the apparatus comprising:

a) a display for displaying an image,
b) an eye imaging sensor for monitoring the user's eye and for providing an output indicative of the user's point of regard in the user's field of vision,
c) an optical combiner, in optical communication with the display, the eye imaging sensor; said optical combiner arranged to receive the displayed image from the display, to project said image into the user's field of vision, to receive electromagnetic radiation reflected from the user's eye and to pass said reflected radiation to the eye imaging sensor,
wherein the optical combiner is adapted to substantially correct for aberrations in the reflected radiation introduced therein by the optical combiner, and
the optical combiner has a coating on a rear face thereof that is substantially reflective at visible wavelengths but substantially transmissive at wavelengths to which the eye imaging sensor is sensitive.

2. An eye tracking apparatus according to claim 1 wherein the optical combiner exhibits an optical power along a primary optical axis such that the displayed image is magnified to provide the projected image.

3. An eye tracking apparatus according to claim 2 wherein the optical combiner comprises a prismatic combiner arranged, in use, in a first optical path between the user's eye and the eye imaging sensor.

4. An eye tracking apparatus according to claim 3 wherein the optical combiner has at least one curved surface arranged, in use, in a second optical path between the display and the user's eye, the at least one curved surface being adapted to receive the displayed image or to project said image.

5. An eye tracking apparatus according to claim 4 wherein the at least one curved surface comprises a spherical surface or an aspheric surface.

6. An eye tracking apparatus according to claim 4 wherein the prismatic combiner comprises an anamorphic prismatic combiner.

7. A head mounted display system comprising an eye tracking apparatus according to claim 1.

8. An eye tracking apparatus for monitoring the movement of a user's eye, the apparatus comprising:
a) a display for displaying an image,
b) an eye imaging sensor for monitoring the user's eye and for providing an output indicative of the user's point of regard in the user's field of vision,
c) an optical combiner, in optical communication with the display, the eye imaging sensor; said optical combiner arranged to receive the displayed image from the display, to project said image into the user's field of vision, to receive electromagnetic radiation reflected from the user's eye and to pass said reflected radiation to the eye imaging sensor,
wherein the optical combiner is adapted to substantially correct for aberrations in the reflected radiation introduced therein by the optical combiner, and the optical combiner has at least one substantially planar surface arranged along the first optical path, the at least one planar surface being adapted to pass the reflected radiation to the eye imaging sensor.

9. An eye tracking apparatus according to claim 8 wherein the substantially planar surface is disposed on a part of the at least one curved surface and arranged in optical communication there-with.

10. An eye tracking device according to claim 9 wherein the substantially planar surface and the at least one curved surface are arranged in optical communication with one another via an adhesive index matched therewith.

11. An eye tracking apparatus according to claim 8, wherein the optical combiner exhibits an optical power along a primary optical axis such that the displayed image is magnified to provide the projected image and further wherein the optical combiner comprises a prismatic combiner arranged, in use, in a first optical path between the user's eye and the eye imaging sensor, and has at least one curved surface arranged, in use, in a second optical path between the display and the user's eye, the at least one curved surface being adapted to receive the displayed image or to project said image, and further wherein the first and second optical paths between the at least one curved surface and the user's eye are coaxial.

12. An eye tracking apparatus according to claim 11, wherein the primary optical axis along which the optical combiner exhibits its optical power is arranged at non zero angle to a normal to the at least one substantially planar surface.

13. An eye tracking apparatus according to claim 12 further comprising an aperture arranged, in use, in optical communication with the eye imaging sensor and the user's eye.

14. An eye tracking apparatus according to claim 13 wherein the aperture and the least one substantially planar surface cooperate to correct for aberrations in the reflected radiation introduced therein by the at least one curved surface of the optical combiner.

15. A method of monitoring the movement of a user's eye comprising the steps of:
(a) displaying an image,
(b) magnifying said image and projecting said magnified image into the user's field of vision along a first optical path through an optical component having an optical power associated therewith,
(c) imaging the user's eye through said optical component along a second optical path, the first and second optical paths being at least partly coincidental,
(d) correcting along a non-coincidental portion of the second optical path for aberrations in images of the user's eye introduced by the optical component, and
(e) passing the corrected images of the user's eye to an eye imaging sensor,
wherein the optical component has a coating on a rear face thereof that is substantially reflective at visible wavelengths but substantially transmissive at wavelengths to which the eye imaging sensor is sensitive.

16. A method of monitoring the movement of a user's eye according to claim 15 comprising the additional step of:
(a) providing an output indicative of the user's point of regard in the user's field of vision.

* * * * *